United States Patent
Ohta

(10) Patent No.: US 12,034,761 B2
(45) Date of Patent: Jul. 9, 2024

(54) ANALYSIS SYSTEM, METHOD, AND PROGRAM

(71) Applicant: NEC Corporation, Tokyo (JP)

(72) Inventor: Yoshinobu Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 17/641,515

(22) PCT Filed: Sep. 27, 2019

(86) PCT No.: PCT/JP2019/038326
§ 371 (c)(1),
(2) Date: Mar. 9, 2022

(87) PCT Pub. No.: WO2021/059521
PCT Pub. Date: Apr. 1, 2021

(65) Prior Publication Data
US 2022/0337619 A1 Oct. 20, 2022

(51) Int. Cl.
*H04L 9/40* (2022.01)

(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,438,634 B1 * | 9/2016 | Ross | H04L 63/02 |
| 10,785,252 B2 * | 9/2020 | Lee | H04L 63/1433 |
| 11,444,974 B1 * | 9/2022 | Shakhzadyan | G06F 21/577 |
| 2007/0261012 A1 * | 11/2007 | Matsuda | G06F 30/3323 716/103 |
| 2019/0052663 A1 * | 2/2019 | Lee | H04L 63/20 |
| 2021/0126936 A1 * | 4/2021 | Gerber, Jr. | H04L 63/20 |

FOREIGN PATENT DOCUMENTS

| | | | |
|---|---|---|---|
| CN | 106411576 A | 2/2017 | |
| JP | 2007-257291 A | 10/2007 | |
| JP | 2007257291 A * | 10/2007 | G06F 17/504 |
| JP | 2016-143299 A | 8/2016 | |

(Continued)

OTHER PUBLICATIONS

International Search Report for PCT Application No. PCT/JP2019/038326, dated Dec. 10, 2019.

(Continued)

*Primary Examiner* — Joseph P Hirl
*Assistant Examiner* — Hassan Saadoun
(74) *Attorney, Agent, or Firm* — Sughrue Mion, PLLC

(57) ABSTRACT

The analysis unit 6 generates one or more pairs of a start point fact which is a fact representing possibility of attack in a device that is a start point and an end point fact which is a fact representing possibility of attack in a device that is an end point. The analysis unit 6 analyzes, for each pair, whether or not it is possible to derive the end point fact from the start point fact, and generates an attack graph from a node corresponding to the start point fact to a node corresponding to the end point fact, in a case where it is possible to derive the end point fact from the start point fact.

12 Claims, 9 Drawing Sheets

(56) References Cited

FOREIGN PATENT DOCUMENTS

| JP | 2017-224053 | A |   | 12/2017 |            |
|----|-------------|---|---|---------|------------|
| JP | 2018-097569 | A |   | 6/2018  |            |
| JP | 2018097569  | A | * | 6/2018  |            |
| KR | 2019017209  | A | * | 2/2019  | H04L 63/1425 |

OTHER PUBLICATIONS

English translation of Written opinion for PCT Application No. PCT/JP2019/038326, dated Dec. 10, 2019.
NEC's Cutting-Edge Technology, NEC, "Cyber attach risk automatic diagnosis technology", [online], Nov. 5, 2018, [retrieval date Dec. 2, 2019], Internet: <URL:https://jpn.nec.com/rd/tecnologies/201804/index.html>, pp. 1-4.
JP Office Action for JP Application No. 2021-548293, dated May 16, 2023 with English Translation.

* cited by examiner

```
ARBITRARY CODE EXECUTION (attacker, DstHost, administrative privileges){
    - SrcHost and DstHost are connected by HTTP
    - Software in DstHost has a vulnerability for privileges escalation
    - attacker has administrative privileges of SrcHost
    - ARBITRARY CODE EXECUTION (exec01)
}
```

ANALYSIS SYSTEM, METHOD, AND PROGRAM

This application is a National Stage Entry of PCT/JP2019/038326 filed on Sep. 27, 2019, the contents of all of which are incorporated herein by reference, in their entirety.

TECHNICAL FIELD

The present invention relates to an analysis system, analysis method, and analysis program for analyzing attacks on systems to be diagnosed.

BACKGROUND ART

An information processing system that includes multiple computers is required to take security measures to protect information assets from cyber attacks. Security measures include assessing the vulnerability of the target system and removing vulnerability as necessary.

Patent literature 1 describes a system that evaluates vulnerability risk based on the system configuration and topology, in addition to the technical characteristics of individual vulnerabilities, and performs risk assessment corresponding to the real system situation. In the technology described in patent literature 1, graph theory is applied to the information on devices, networks, vulnerabilities, and security settings to model (graph) the relationships among them. The risk of the system is then assessed by applying inference algorithms to the model.

CITATION LIST

Patent Literatures

PTL 1: Japanese Patent Application Laid-Open No. 2016-143299

SUMMARY OF INVENTION

Technical Problem

However, when targeting a large-scale system, the information on devices, networks, vulnerabilities, and security settings becomes enormous, and the model (graph) used in the technique described in patent literature 1 becomes large-scale. As a result, the calculation amount increases exponentially when inference algorithms are applied to such large-scale models (graphs).

Therefore, the purpose of the present invention is to provide an analysis system, an analysis method, and an analysis program that can reduce the calculation amount of risk analysis.

Solution to Problem

An analysis system according to the present invention comprises a fact generation unit which generates a fact which is data representing security situation of a system to be diagnosed, based on information regarding each device included in the system to be diagnosed; and an analysis unit which generates one or more pairs of a start point fact which is a fact representing possibility of attack in a device that is a start point and an end point fact which is a fact representing possibility of attack in a device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generates an attack graph from a node corresponding to the start point fact to a node corresponding to the end point fact, in a case where it is possible to derive the end point fact from the start point fact.

In an analysis method according to the present invention, one or more computers generate a fact which is data representing security situation of a system to be diagnosed, based on information regarding each device included in the system to be diagnosed; and generate one or more pairs of a start point fact which is a fact representing possibility of attack in a device that is a start point and an end point fact which is a fact representing possibility of attack in a device that is an end point, analyze, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generate an attack graph from a node corresponding to the start point fact to a node corresponding to the end point fact, in a case where it is possible to derive the end point fact from the start point fact.

An analysis program according to the present invention causes a computer to execute: a fact generation process of generating a fact which is data representing security situation of a system to be diagnosed, based on information regarding each device included in the system to be diagnosed; and an analysis process of generating one or more pairs of a start point fact which is a fact representing possibility of attack in a device that is a start point and an end point fact which is a fact representing possibility of attack in a device that is an end point, analyzing, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generating an attack graph from a node corresponding to the start point fact to a node corresponding to the end point fact, in a case where it is possible to derive the end point fact from the start point fact.

Advantageous Effects of Invention

According to the present invention, it is possible to reduce the calculation amount of risk analysis.

DESCRIPTION OF EMBODIMENTS

Figure 1:
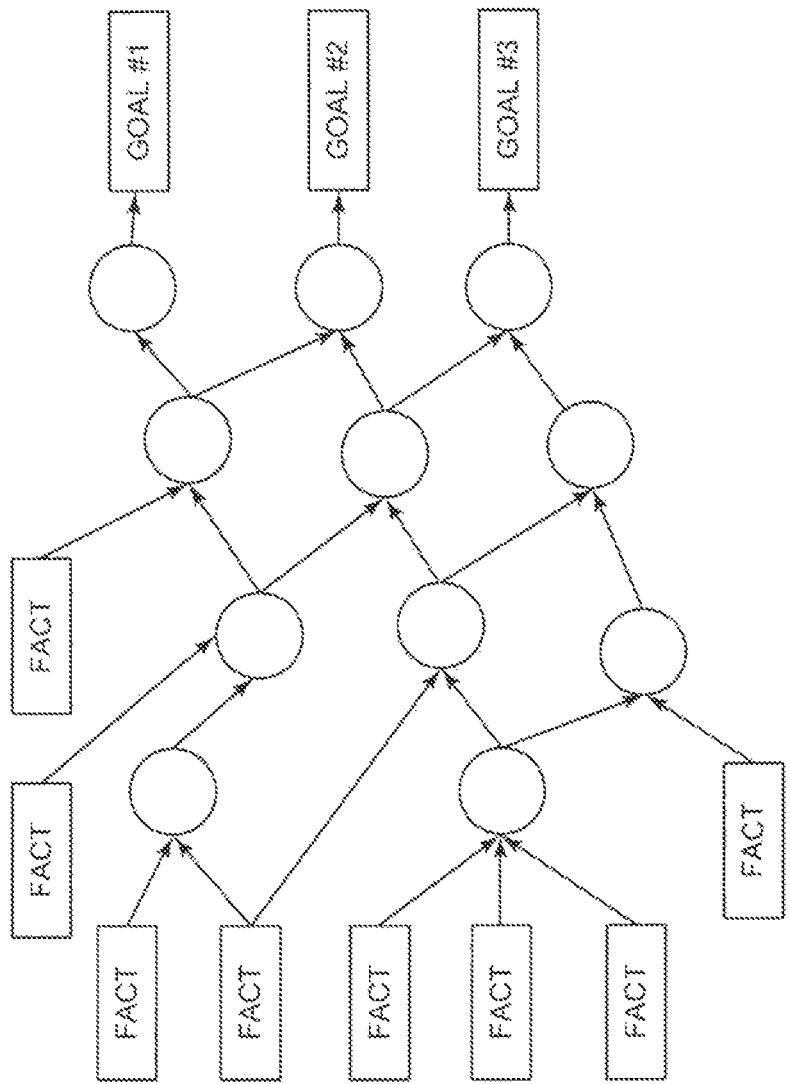
FIG. 1 It depicts a schematic diagram of a general attack graph.

The analysis system described in each of the following example embodiments is a system for analyzing cyber attacks on the system to be diagnosed (assessed). A system to be diagnosed is a system that is a target of security diagnosis. Examples of systems to be diagnosed include information technology (IT) systems in a company and so-called operational technology (OT) systems for controlling a factory, a plant or the like. However, the systems to be diagnosed are not limited to these systems. A system in which multiple devices are connected through a communication network can be a system to be diagnosed.

Each device included in the system to be diagnosed is connected through a communication network. Examples of devices included in the system to be diagnosed include personal computers, servers, switches, routers, machine tools installed in factories, and control devices for machine tools. However, the devices are not limited to the above examples. The devices may be physical devices or virtual devices.

A way to analyze attacks on the system to be diagnosed is to use an attack graph. An attack graph is a graph that can show the state of a device, such as the presence or the absence of vulnerability, and a relationship between an attack that can be executed on one device and an attack that can be executed on other devices based on the attack that can be executed on the one device. An attack graph is represented as a directed graph where any state (device, network, vulnerability, security settings, etc.), that may relate to security, is defined as a fact, the states are nodes, and the relationships between facts are edges.

Here, a fact is data that represents the security situation of the system to be diagnosed. As a more detailed example, a fact represents some state of the system to be diagnosed, or a device included in the system to be diagnosed, that may relate to security mainly. As another detailed example, a fact represents an attack that may be performed on each device included in the system to be diagnosed. In this case, the fact is expressed in the form of a combination of a device and an attack state, or a combination of a device, an attack state and privileges, as described below. In the analysis of attack, it is assumed that some attacks can be carried out on the devices included in the system to be diagnosed. Such an assumption may be treated as a fact.

The facts can be determined from information obtained from each device included in the system to be diagnosed. In addition, a rule for deriving new facts from existing facts (hereinafter, referred to as an analysis rule) can be used to derive a new fact from one or more existing facts. The rules for deriving new facts from existing facts (hereinafter, referred to as analysis rules) can be used to derive new facts from one or more existing facts. For example, a new fact can be derived based on the facts determined from information obtained from each device in the system to be diagnosed, using the analysis rule. Furthermore, another new fact can be derived based on the facts determined from information obtained from each device and a newly obtained fact. This process is repeated until no new fact can be derived from the analysis rule. Then, an attack graph can be generated by setting each fact to a node, connecting each node corresponding to a fact with an edge extending from a node corresponding to the fact that is the basis of a newly obtained fact to the node corresponding to the newly obtained fact.

FIG. 1 a schematic diagram showing an example of a general attack graph obtained in this way. In FIG. 1, nodes represented by rectangles labeled "FACT" represent the facts determined from information obtained from each device. In FIG. 1, nodes represented by circles and nodes represented by rectangles labeled "GOAL" represent facts that are newly derived using the analysis rule. The "GOAL"s in FIG. 1 are a part of the newly derived facts using the analysis rule, and represent the facts that are end points of fact derivations using the analysis rule.

The analysis system of each example embodiment described below generates an attack graph that can be used to analyze attacks on the system to be diagnosed. The analysis system of each example embodiment generates one or more pairs of a fact that is the start point and a fact that is the end point, and generates an attack graph for each pair.

Hereinafter, an example embodiment of the present invention will be described with reference to the drawings.

Example Embodiment 1

Figure 2:
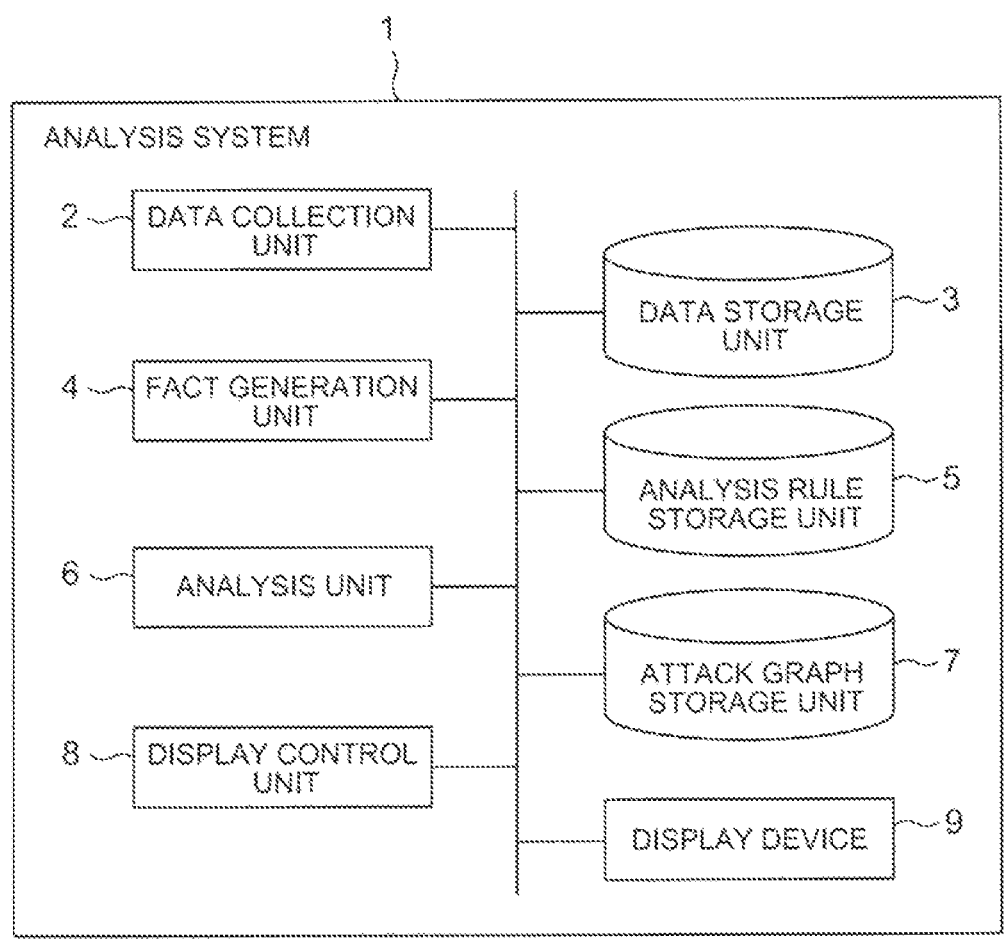
FIG. 2 It depicts a block diagram showing an example of an analysis system of an example embodiment of the present invention.

FIG. 2 is a block diagram showing an example of the analysis system of the first example embodiment of the present invention. The analysis system 1 of the present example embodiment comprises a data collection unit 2, a data storage unit 3, a fact generation unit 4, an analysis rule storage unit 5, an analysis unit 6, an attack graph storage unit 7, a display control unit 8, and a display device 9.

The data collection unit 2 collects information regarding each device included in the system to be diagnosed.

The information regarding the device is information that can be related to the security of the device. Examples of information regarding the device that the data collection unit 2 collects include an operating system (OS) installed on the device and its version information, hardware configuration information installed on the device, software installed on the device and its version information, information on the communication data exchanged between the device and other devices and the communication protocol used to exchange the communication data, information on the status of ports of the device (which ports are open) and so on, for example. The communication data includes information on a source and a destination of the communication data. The data collection unit 2 collects the above information. However, examples of the information collected by the data collection unit 2 are not limited to the above examples. The data collection unit 2 may also collect other information that may be relevant to the security of the device as information regarding the device.

The data collection unit 2 may collect information regarding the devices directly from each device included in the system to be diagnosed. In this case, the analysis system 1 is connected to each device through a communication network, and the data collection unit 2 can collect information from each device through the communication network.

Alternatively, the data collection unit 2 may obtain information regarding each device from an information collection server that collects information regarding each device. In this case, the analysis system 1 is connected to the information collection server through a communication network, and the data collection unit 2 can collect information regarding each device from the information collection server through the communication network.

When each device has an agent, the data collection unit 2 may collect information regarding each device through the agent. In other words, the data collection unit 2 may obtain information regarding each device from the information collection server that collects information regarding each device through the agent.

Each agent installed in each device may transmit information regarding the device to the information collection server, and the data collection unit 2 may collect information regarding each device included in the system to be diagnosed from that information collection server. In this case, for example, the analysis system 1 is connected to the information collection server through a communication network, and the data collection unit 2 may collect information regarding each device from that information collection server through the communication network.

When the data collection unit 2 collects information regarding each device included in the system to be diagnosed, the data collection unit 2 stores the information in the data storage unit 3.

The data storage unit 3 is a storage device that stores the information regarding each device collected by the data collection unit 2.

The fact generation unit 4 generates one or more facts based on the information regarding each device collected by the data collection unit 2. As already explained, the fact represents the security situation of the system to be diagnosed. The fact generated by the fact generation unit 4 represents some state mainly related to security of one or more devices included in the system to be diagnosed, derived from the specific information obtained from each device.

For example, the fact generation unit 4 generates one or more facts by referring to the rule for generating facts that include one or more templates representing the facts to be generated, which have been prepared in advance, and determining whether or not the information regarding each device matches the respective template. Information regarding each device is applied to the parameters of the generated facts as appropriate.

Figure 3:
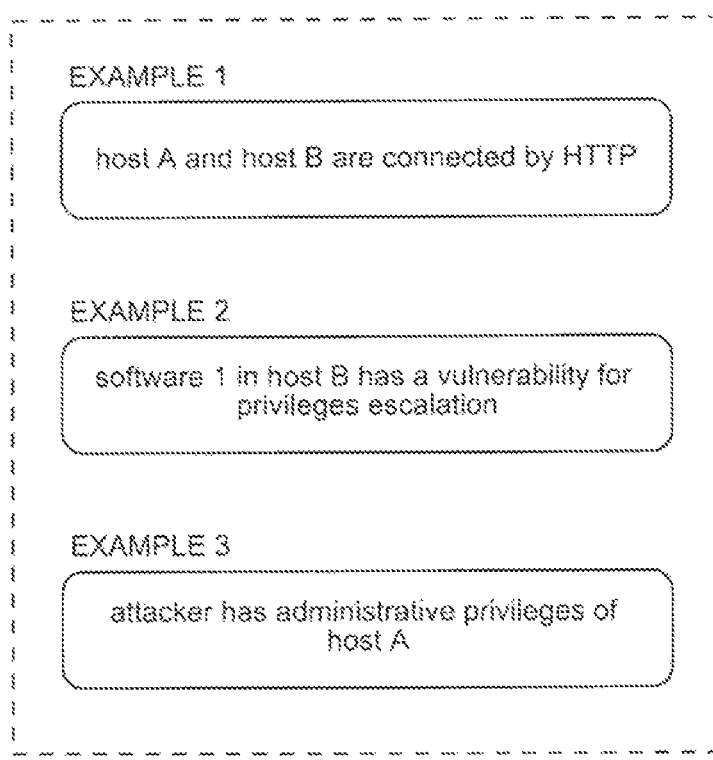
FIG. 3 It depicts a diagram showing an example of a generated fact.

FIG. 3 shows an example of the facts that are generated. Although three facts are shown in FIG. 3, the facts are not limited to the three shown in FIG. 3. The facts necessary for the processing in the analysis unit 6 should be generated accordingly.

The fact shown as example 1 in FIG. 3 represents that "It is possible to communicate from device 'host A' to device 'host B' by HTTP (HyperText Transfer Protocol)".

The fact shown as example 2 in FIG. 3 represents that "There is a vulnerability in the software 1 installed in device 'host B', and administrative privileges can be obtained by attacking the vulnerability".

The fact shown as example 3 in FIG. 3 represents that "The attacker has administrative privileges of device 'host A'".

The description format of the fact is not limited to the example shown in FIG. 3, but can be in other formats as long as the processing in the analysis unit 6 can be performed.

The analysis rule storage unit 5 is a storage device that stores analysis rules. An analysis rule is a rule for deriving a new fact from an existing fact. The fact derived using the analysis rule is mainly a fact that represents an attack that can be performed on each device included in the system to be diagnosed. The analysis rule storage unit 5 stores one or more analysis rules according to the system to be diagnosed.

Figures 4, 5:
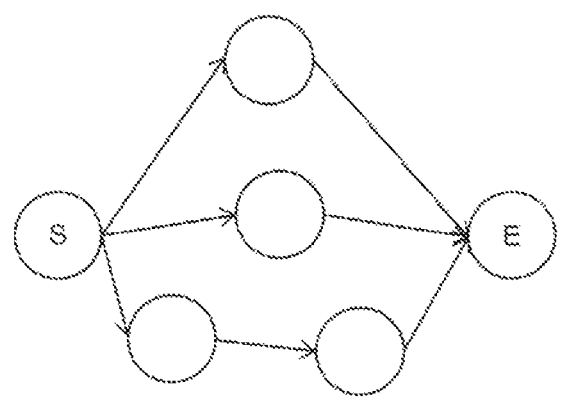
FIG. 4 It depicts a diagram showing an example of an analysis rule.
FIG. 5 It depicts a schematic diagram showing an example of an attack graph with a single node corresponding to a fact that is the end point.

FIG. 4 shows an example of an analysis rule. The analysis rule includes at least an element that represents the new fact to be derived and an element that corresponds to the condition. In other words, the analysis rule indicates that a new fact will be derived if there is a fact that matches the condition. In the example shown in FIG. 4, the element in the first line is the element that represents the new fact to be derived. In addition, each element from the second to the fourth line is an element that corresponds to a condition. In the analysis rule shown in FIG. 4, the new fact represented in the first line is derived when there are facts that matches all three conditions. The analysis rule may also include an element representing a label that is uniquely defined for that analysis rule. In the example shown in FIG. 4, the element in line 5 is the element that represents the label uniquely defined for the analysis rule. The element in the fifth line represents that the label of the analysis rule shown in FIG. 4 is "ARBITRARY CODE EXECUTION (exec01)".

In FIG. 4, parameters that begin with a capital letter are variables. The variable parameters mean that they may be changeable depending on the fact to be matched. In the example shown in FIG. 4, "SrcHost" and "DstHost" are variables. Various information included in the information collected from the device is assigned to the parameters as variables. In a single analysis rule, variables described by the same parameter are assigned to a common value. For example, a common concrete device ID is assigned to the variable "SrcHost" described in the second and fourth lines of FIG. 4. Similarly, a common concrete device ID is assigned to the variable "DstHost" described in the second and third lines of FIG. 4.

In the analysis rule shown in FIG. 4, the same information regarding the device is assigned to the same variables included in the conditions. In other words, in the analysis rule shown in FIG. 4, the same information regarding the device is assigned to each of the "SrcHost" and "DstHost" parameters. In the example shown in FIG. 4, if the information regarding the device is applied to the variables as described above, and when there are facts that matches each of the conditions, a new fact represented in the first line is derived. The new fact represented in the first row is the fact that the information regarding the device is assigned to the variable.

The description format of the analysis rules is not limited to the example shown in FIG. 4.

The analysis unit 6 generates an attack graph for a pair which is possible to derive a fact that is the end point from a fact that is the start point among one or more pairs of a fact that is the start point and a fact that is the end point. As an example, the analysis unit 6 analyzes whether or not it is possible to derive a fact that is the end point from a fact that is the start point. When the fact that is the end point can be derived from the fact that is the start point, then the analysis unit 6 generates the attack graph. The analysis unit 6 analyzes whether or not it is possible to derive the fact that is the end point from the fact that is the start point using the fact generated from the information regarding the device that is the start point and the device that is the end point, the fact that is the start point, and the analysis rule stored in the analysis rule storage unit 5, and generates the attack graph. In this analysis, the analysis unit 6 does not use facts generated from information regarding devices that do not correspond to either the device that is the start point or the device that is the end point.

The fact that is the start point may be referred to simply as a start point fact. Similarly, the fact that is the end point may be referred to simply as an end point fact.

Each of the fact that is the start point and the fact that is the end point is usually a fact (a fact that represents the possibility of an attack) that represents an attack that can be performed on each device in the system to be diagnosed. In other words, the ability to derive a fact that is the end point from a fact that is the start point indicates that if some attack is possible on the device that is the start point, another attack is possible on the device that is the end point. The inability to derive the fact that is the end point from the fact that is the start point indicates that even if some attack is possible on the device that is the start point, another attack represented by the fact that is the end point cannot be executed on the device fact that is the end point.

A more specific operation example is described below. The analysis unit 6 generates one or more pairs of a fact that is the start point of an attack graph and a fact that is the end point of the attack graph. The fact that is the start point and the fact that is the end point are facts that represent an attack that can take place on the device that is the start point and the device that is the end point, respectively.

The analysis unit 6 analyzes whether or not it is possible to derive the fact that is the end point from the fact that is the start point, based on the fact generated from the information regarding the device that is the start point and the device that is the end point, the fact that is the start point, and the analysis rule stored in the analysis rule storage unit 5, for each pair of the fact that is the start point of the attack graph and the fact that is the end point of the attack graph. At this time, the analysis unit 6 does not use facts generated from information regarding devices that do not correspond to either the device that is the start point or the device that is the end point.

The fact that is the start point of the attack graph and the fact that is the end point of the attack graph will be described.

There are multiple types of attacks, and the attacks that a device may be subjected to vary depending on the vulnerability the which device has. Therefore, in the example embodiments of the present invention, the state of a device that may be attacked by vulnerability is defined as the attack state. For example, as the attack state, "a state in which code can be executed (hereinafter, referred to as "arbitrary code execution")", "a state in which data can be tampered with (hereinafter, referred to as "data tampering"), etc. are given. In the present example embodiment, there are two attack states "arbitrary code execution", and "data tampering" as an example. However, the attack states are not limited to the above two types. Other types of attack states may be given depending on the attacks that may occur in the system to be diagnosed. An attack state that includes multiple attack states may also be defined.

The analysis unit 6 generates a combination of one of the device IDs of devices included in the system to be diagnosed, one of the multiple predetermined attack states, and one of the privileges that can correspond to the attack states as the fact that is the start point of the attack graph.

Similarly, the analysis unit 6 generates a combination of one of the device IDs of devices included in the system to be diagnosed, one of the multiple predetermined attack states, and one of the privileges that can correspond to the attack states as the fact that is the end point of the attack graph.

Here, "privileges" includes privileges when the attack indicated by the attack state is performed. In this case, the privilege is, for example, either administrative privileges or general privileges. In addition, "privileges" may include the fact that privilege is not relevant when the attack indicated by the attack state is performed (hereinafter, referred to as "no relevant privileges"). Therefore, the predetermined multiple types of privileges are, as an example, "administrative privileges", "general privileges", and "no relevant privileges".

The combination of attack state and privileges can be determined according to the specific content of the attack state. For example, each of the attacks indicated by "arbitrary code execution," and "data tampering" can be performed under some privileges, such as administrative or general privileges. Therefore, for each attack state of "arbitrary code execution," and "data tampering," appropriate privileges such as "administrative privileges" or "general privileges" can be combined, depending on the specifics of each attack state. In this example, attack states are two types, "arbitrary code execution", and "data tampering", there is no attack state to be combined with "no relevant privileges".

Under such a combination of attack state and privileges, the analysis unit 6 generates a combination of a device corresponding to one of the devices included in the system to be diagnosed, one of the multiple types of attack states, and one of the privileges that can correspond to the attack state, as the fact that is the start point of the attack graph under such a combination of attack states and privileges. Similarly, the analysis unit 6 generates a combination of a device corresponding to one of the devices included in the system to be diagnosed, one of the multiple types of attack states, and one of the multiple types of privileges that can correspond to the attack state, as a fact that is the end point of the attack graph under such a combination of attack states and privileges.

In this way, the combination of "device, attack state, and privileges" is treated as a fact that is the start point of the attack graph or a fact that is the end point of the attack graph. When the attack graph is generated, the device included in a fact is represented by a device ID, for example. In other words, each of a fact that is the start point or a fact that is the end point is a fact that indicates possibility under the attack represented by the attack state in the device represented by the device ID.

Furthermore, the analysis unit 6 determines a pair of a fact (a combination of "device, attack state, and privileges") that is the start point of the attack graph and a fact (a combinations of "device, attack state, and privileges") that is the end point of the attack graph. In this case, the analysis unit 6 may exhaustively determine all pairs of facts that are the start points and facts that are the end points in the system to be diagnosed, or some of all pairs. In the case of defining some of all pairs, the analysis unit 6 may determine a pair of the fact that is the start point and the fact that is the end point based on some of the devices included in the system to be diagnosed, such as devices included in a specific subnet in the system to be diagnosed. That is, when the analysis unit 6 generates the fact that is the start point and the fact that is the end point based on some of the devices included in the system to be diagnosed, the analysis unit 6 may regard the devices included in the same subnet of the system to be diagnosed as some of the devices. The analysis unit 6 may also determine the pair of the fact that is the start point and the fact that is the end point by excluding pairs of devices that need to go through other devices for communication, i.e., pairs of devices that cannot communicate directly. In other words, when the analysis unit 6 generates the fact that is the start point and the fact that is the end point based on some of the devices included in the system to be diagnosed, the analysis unit 6 may regard the devices that can communicate directly as some of the devices.

In this case, the analysis unit 6 may determine combinations of the devices that are the start points and the devices that are the end points, and under each combination of devices, determine the fact (a combination of "device, attack state, and privileges") that is the start point and the fact (a combination of "device, attack state, and privileges") that is the end point.

The device included in the fact that is the start point and the device included in the fact that is the end point may be the same device. In this case, the analysis unit 6 can also analyze whether it is possible to reach from one attack state of a device to another attack state, in other words, if a certain attack is possible on a device, whether another attack is possible on the device.

After defining one or more pairs of the fact that is the start point and the fact that is the end point as described above, the analysis unit 6 analyzes, for each pair, whether or not it is possible to derive the fact that is the end point from the fact that is the start point, based on the fact representing the state of each device generated from the information regarding the device that is the start point and the information regarding the device that is the end point, the fact that is the start point, and one or more predetermined analysis rules. In this case, the analysis unit 6 can apply an inference algorithm based on the analysis rule stored in the analysis rule storage unit 5, for example.

The analysis unit 6 may use other methods to analyze whether it is possible to derive the fact that is the end point from the fact that is the start point. In this case, when the analysis unit 6 is able to determine that the fact that is the end point cannot be derived from the fact that is the start point, the analysis unit 6 may terminate the analysis for the pair.

Then, the analysis unit 6 generates an attack graph from the fact that is the start point to the fact that is the end point in the focused pair. When generating the attack graph, the analysis unit 6 connects the facts by edges from the fact that is the basis of the newly derived fact to the newly derived fact in each fact from the fact that is the start point to the fact that is the end point with each fact as a node.

Figure 6:
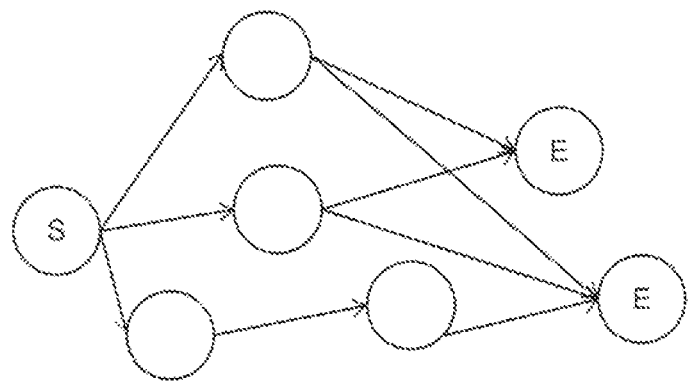
FIG. 6 It depicts a schematic diagram showing an example of an attack graph with two nodes corresponding to a fact that is the end point.

In the generated attack graph, the number of nodes that correspond to the fact that is the end point is not limited to one. The attack graph with multiple nodes corresponding to the fact that is the end point may be generated. FIG. 5 is a schematic diagram showing an example of an attack graph with a single node corresponding to the fact that is the end point. FIG. 6 is a schematic diagram showing an example of an attack graph with two nodes corresponding to the fact that is the end point. In FIG. 5 and FIG. 6, "S" represents the fact that is the start point, and "E" represents the fact that is the end point. The contents of the two facts "E" shown in FIG. 6 are identical. The two facts "E" with the same content are facts derived based on different analysis rules. In other words, even if the analysis rules used to derive the facts are different, multiple facts with the same content can be derived as the end point. FIG. 6 shows an example of such a case.

The analysis unit 6 analyzes whether or not it is possible to derive the fact that is the end point from the fact that is the start point for each pair of facts that is the start point and the end point, and generates an attack graph if it is possible to derive the fact that is the end point. Then, the analysis unit 6 stores each generated attack graph in the attack graph storage unit 7. The attack graph storage unit 7 is a storage device that stores the attack graphs.

The display control unit 8 displays each attack graph generated by the analysis unit 6 on the display device 9. The display control unit 8 can read each attack graph from the attack graph storage unit 7 and display each attack graph on the display device 9.

The display control unit 8 may also display other information on the display device 9 along with the attack graph.

For example, the display control unit 8 may display the fact that is the start point, the fact that is the end point, and whether those facts are valid (for example, whether the attack hypothesized in the fact that is the start point can actually occur in the device that is the start point, etc.).

For example, the display control unit 8 may also display information on each fact or device used in the analysis.

For example, the display control unit 8 may also display the generation process of the attack graph for each attack graph.

For example, the display control unit 8 may display that the fact that is the end point could not be derived for a pair for which the fact that is the end point could not be derived from the fact that is the start point. In other words, the display control unit 8 may indicate that no attack graph was generated for that pair. This display allows a security administrator (hereinafter, referred to as "administrator") to grasp the useful information that even if one attack is possible on the device that is the start point, it does not necessarily mean that another attack is possible on the device that is the end point.

The information illustrated above will make it easier for the administrator to manage the system to be diagnosed and to plan countermeasures against attacks.

The display device 9 is a device that displays information, and can be a general display device. When the analysis system 1 exists in the cloud, the display device 9 may be a display device of a terminal connected to the cloud.

The data collection unit 2 is realized by the CPU (Central Processing Unit) of a computer that operates according to the analysis program and the communication interface of the computer, for example. For example, the CPU can read the analysis program from a program storage medium such as a program storage device, etc. of the computer, and operate as the data collection unit 2 according to the analysis program and using the communication interface. In addition, the fact generation unit 4, the analysis unit 6 and the display control unit 8 can be realized by the CPU of the computer operating according to the analysis program, for example. For example, the CPU reads the analysis program from the program recording medium as described above, and operates as the fact generation unit 4, the analysis unit 6 and the display control unit 8 according to the analysis program. For example, the data storage unit 3, the analysis rule storage unit 5 and the attack graph storage unit 7 are realized by the storage device provided by the computer.

Figure 7:
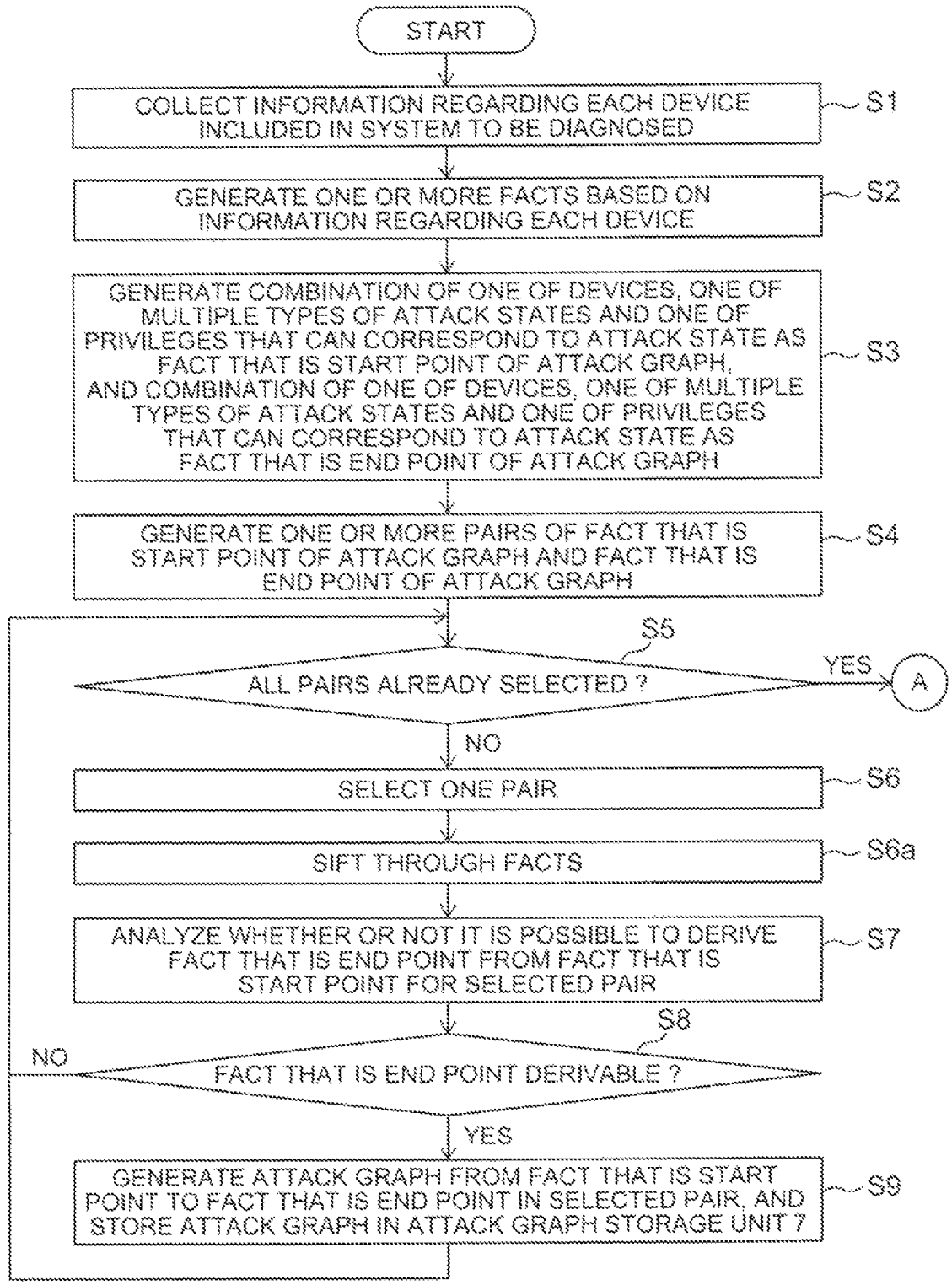
FIG. 7 It depicts a flowchart showing an example of the processing process of an analysis system of the example embodiment of the present invention.
Figure 8:
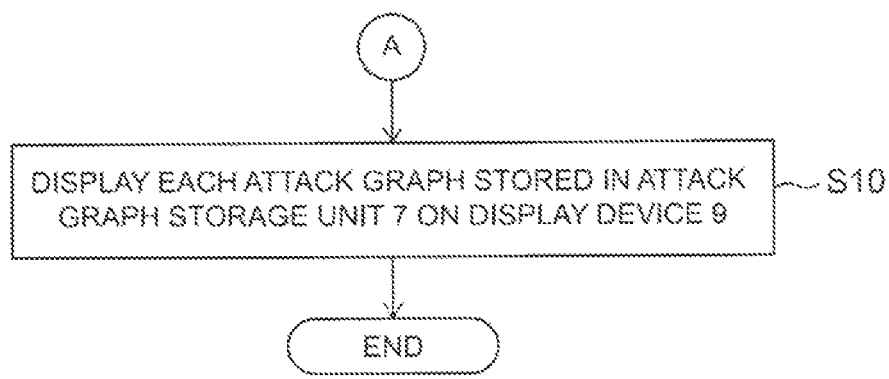
FIG. 8 It depicts a flowchart showing an example of the processing process of an analysis system of the example embodiment of the present invention.

Next, the processing process will be described. FIGS. 7 and 8 are flowcharts showing an example of the processing process of the analysis system of the example embodiment of the present invention. The matters already explained are omitted.

First, the data collection unit 2 collects information regarding each device included in the system to be diagnosed (step S1). The data collection unit 2 stores the collected data in the data storage unit 3.

Next, the fact generation unit 4 generates one or more facts based on the information regarding each device (step S2).

Next, the analysis unit 6 generates a combination of one of the devices, one of the multiple types of attack states, and one of the privileges that can correspond to the attack state as the fact that is the start point of the attack graph. Similarly, the analysis unit 6 generates a combination of one of the devices, one of the multiple types of attack states, and one of the privileges that can correspond to the attack state as a fact that is the end point of the attack graph (step S3).

Next, the analysis unit 6 generates one or more pairs of a fact that is the start point of the attack graph and a fact that is the end point of the attack graph (step S4).

Next, the analysis unit 6 determines whether all the pairs generated in step S4 have already been selected in step S6 (step S5). When there are unselected pairs (No in step S5), the process moves to step S6. When the process first moves to step S5 from step S4, not a single pair has been selected. Therefore, in this case, the process moves to step S6.

In step S6, the analysis unit 6 selects one of the pairs generated in step S4 that has not yet been selected.

Following step S6, the analysis unit 6 sifts through the facts (step S6a). In step S6a, the analysis unit 6 selects facts to be used in the analysis of step S7, and does not select facts that are not used in the analysis of step S7. Specifically, the analysis unit 6 selects the fact generated from the information regarding the device that is the start point and information regarding the device that is the end point, and the fact that is the start point. The analysis unit 6 does not select a fact generated based on information regarding a device that does not correspond to either the device that is the start point or the device that is the end point. The fact generated based on information regarding a device that does not correspond to either the device that is the start point or the device that is the end point is not used in the analysis of step S7.

After step S6a, the analysis unit 6 analyzes whether or not it is possible to derive the fact that is the end point from the fact that is the start point for the selected pair (step S7). At the start of step S7, the analysis unit 6 regards a fact generated from the information regarding the device that is the start point and the information regarding the device that is the end point, and the fact that is the start point (i.e., the fact selected in step S6a) as the existing facts (facts for reference). Then, when the analysis unit 6 derives a new fact based on the analysis rule, the analysis unit 6 adds the new fact to the above existing facts (facts for reference). The analysis unit 6 analyzes whether or not it is possible to derive the fact that is the end point by repeating the derivation of a new fact based on the existing facts (facts for reference) and the analysis rule. When the fact that is the end point in the selected pair cannot be obtained even after repeating the derivation of a new fact until no new facts can be derived, the analysis unit 6 determines that the fact that is the end point cannot be derived from the fact that is the start point.

When the fact that is the end point cannot be derived from the fact that is the start point (No of step S8), the analysis unit 6 repeats the process from step S5.

When the fact that is the end point can be derived from the fact that is the start point (Yes of step S8), the analysis unit 6 regards facts in the selected pair as nodes, generates an attack graph from the fact that is the start point to the fact that is the end point, and stores the attack graph in the attack graph storage unit 7 (step S9). After step S9, the analysis unit 6 repeats the process from step S5.

When the analysis unit 6 determines that all the pairs generated in step S4 have already been selected in step S6 (Yes of step S5), the display control unit 8 reads each attack graph stored in the attack graph storage unit 7, and displays each attack graph on the display device 9 (Step S10, refer to FIG. 8).

According to the present example embodiment, the analysis unit 6 generates one or more pairs of the fact that is the start point of the attack graph and the fact that is the end point of the attack graph. In addition, when the analysis unit 6 selects one pair in step S6, and analyzes whether or not it is possible to derive the fact that is the end point for that pair (step S7), at the start of step S7, the fact generated from the information regarding the device that is the start point and the information regarding the device that is the end point and the fact that is the start point are regarded as the existing facts. In other words, at that point, these existing facts are the facts to be referenced by the analysis unit 6. Therefore, among the facts generated by the fact generation unit 4, the facts generated from the information regarding the device that is the start point and the information regarding the device that is the end point are the facts to be referenced in step S7. All the other facts are excluded from the reference in step S7. The selection of the facts that are excluded from the reference and the facts that are existing facts at the start of step S7 is done in step S6a. In other words, in step S6a, the analysis unit 6 selects the facts generated from the information regarding the device that is the start point and the information regarding the device that is the end point, and the fact that is the start point. These facts are the existing facts at the start of step S7. In step S6a, the analysis unit 6 does not select the facts generated based on the information regarding the device that is not either the device that is the start point or the device that is the end point. As a result, these facts are excluded from the reference in step S7. As a result, when analyzing whether it is possible to derive a fact that is the end point from a fact that is the start point, it is analyzed whether it is possible to derive the fact that is the end point from the fact that is the start point without deriving redundant facts. Therefore, the calculation amount of generating the attack graph for each pair can be reduced. In other words, in the present example embodiment, it is possible to analyze the attack on the system to be diagnosed while reducing the calculation amount.

The case of generating an attack graph without restricting the facts to be referenced is compared with the case of generating an attack graph in the present example embodiment. In the case of generating the attack graph without restricting the facts to be referenced, as the number of devices in the system to be diagnosed increases, the number of facts that represent the state of the devices increases, and as a result, the number of newly generated facts based on the analysis rules also increases. As a result, the calculation time required to generate the attack graph increases.

On the other hand, in the present example embodiment, the analysis unit 6 generates the attack graph for one or more pairs of the fact that is the start point of the attack graphs and the fact that is the end point of the attack graphs. Then, as mentioned above, at the time of starting the analysis of whether or not it is possible to derive the fact that is the end point from the fact that is the start point for each pair, the facts to be referenced are restricted. In other words, in this case, the facts to be referenced are the facts generated from the information regarding the device that is the start point and the information regarding the device that is the end point, and the fact that is the start point. Facts generated based on information regarding device that do not correspond to either the device that is the start point or the device that is the end point are excluded from the reference in step S7. As a result, it is possible to analyze whether or not it is possible to derive the fact that is the end point from the fact that is the start point without deriving facts related to devices other than the device that is the point and the device that is the end point. In other words, by restricting the facts to be referenced, a series of facts that directly derive the fact that is the end point from the fact that is the start point are derived, and the derivation of other redundant facts is suppressed. Therefore, it is possible to reduce the calculation amount required to generate the attack graph from the fact that is the start point to the fact that is the end point. In other words, it is possible to reduce the calculation amount of risk analysis.

Figure 9:
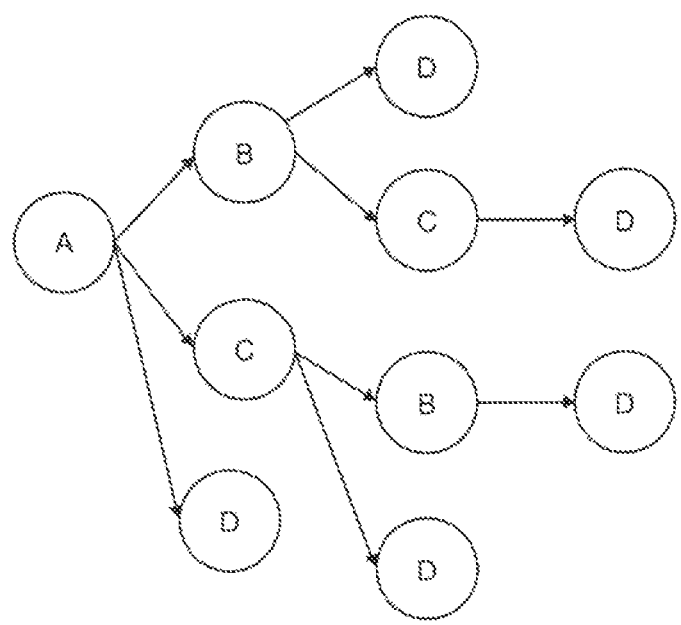
FIG. 9 It depicts a schematic diagram showing an example of an attack graph including duplicate paths.

In addition, there may be multiple duplicate paths in one attack graph. FIG. 9 is a schematic diagram showing an example of an attack graph including duplicate paths. In the example shown in FIG. 9, there are multiple paths from Fact C to Fact D and from Fact B to Fact D. In the present example embodiment of the present invention, by narrowing down the facts to be referenced to the facts related to the device that is the start point and the device that is the end point, the possibility of occurrence of duplicate paths can be reduced.

Next, modifications of the example embodiment of the present invention will be described.

In the above example embodiment, it has been explained that the analysis unit 6 generates a combination of one of the devices, one of the multiple types of attack states, and one of the privileges that can correspond to the attack state as the fact that is the start point or the fact that is the end point of the attack graph. When generating the fact that is the start point and the fact that is the end point of the attack graph, the analysis unit 6 does not include the privileges in the combination, but instead generates a combination of one of the devices and one of the multiple types of attack states as the fact that is the start point or the fact that is the end point. In other words, each of the fact that is the start point and the fact that is the end point may be at least a pair of a device and an attack state. In this case, the analysis unit 6 may generate a combination of one of the devices and one of the multiple attack states as the fact that is the start point of the attack graph and a combination of one of the devices and one of the multiple attack states as the fact that is the end point of the attack graph.

According to the present modification, the analysis unit 6 can perform the process faster because the privileges are excluded from the combinations that correspond to the fact that is the start point and the fact that is the end point. That is, the analysis unit 6 can generate attack graphs faster.

The analysis unit 6 may first generate combinations that exclude privileges as the fact that is the start point and the fact that is the end point, analyze whether it is possible to derive the fact that is the end point from the fact that is the start point, and when it is determined that it is possible to derive the fact that is the end point from the fact that is the start point, the analysis unit 6 may newly generate a combination including the device, attack state, and privileges for the fact that is the start point and the fact that is the end point. Then, the analysis unit 6 may analyze whether or not it is possible to derive the fact that is the end point from the fact that is the start point again. This process can efficiently generate an attack graph while preventing redundant analysis that may occur when generating a combination that excludes privileges for the fact that is the start point or the fact that is the end point.

Example Embodiment 2

The analysis system of the second example embodiment of the present invention can also be represented in the same way as the first example embodiment, as illustrated in FIG. 2. Therefore, the second example embodiment will be described with reference to FIG. 2.

The analysis system 1 of the second example embodiment of the present invention performs the same operation as the first example embodiment. Descriptions of operations similar to those of the first example embodiment will be omitted. In the second example embodiment, the analysis unit 6 further performs the process of connecting the plurality of generated attack graphs. Hereinafter, the operation of connecting the attack graphs by the analysis unit 6 will be described.

In the second example embodiment, when the analysis unit 6 is able to connect multiple attack graphs obtained by the looping process of steps S5 to S9, the multiple attack graphs are connected. The condition for connecting the attack graphs is that the fact that is the end point of one attack graph matches the fact that is the start point of another attack graph. Thus, if the fact that is the end point of one attack graph matches the fact that is the start point of another attack graph, the analysis unit 6 determines that the two attack graphs can be connected. Then, the analysis unit 6 connects the two attack graphs by making the node corresponding to the fact that is the end point of one attack graph and the node corresponding to the fact that is the start point of another attack graph the same node. Another condition for connecting attack graphs is that the fact that is the start point of one attack graph matches the fact that is the start point of another attack graph. In other words, if the fact that is the start point of one attack graph matches the fact that is the start point of another attack graph, then the analysis unit 6 determines that the two attack graphs can be connected. Then, the analysis unit 6 connects the two graphs by making the node corresponding to the fact that is the start point of one attack graph and the node corresponding to the fact that is the start point of another attack graph the same node.

Figure 10:
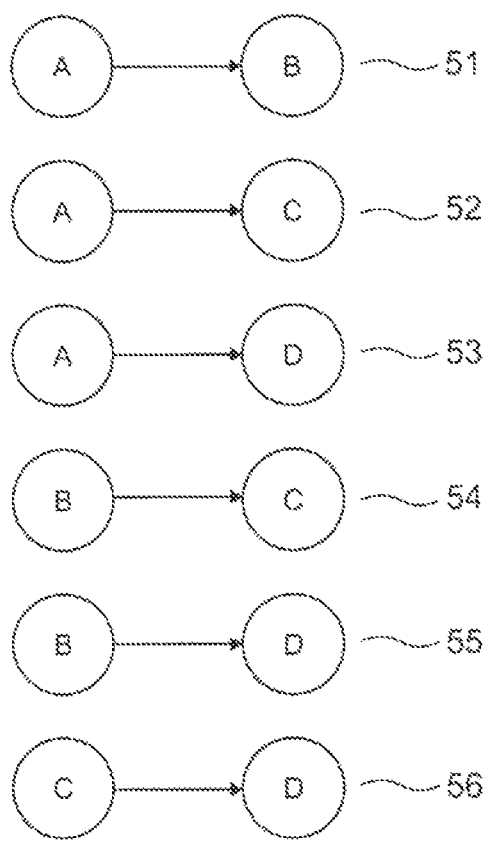
FIG. 10 It depicts a schematic diagram of attack graphs generated for each pair of a fact that is the start point and a fact that is the end point.

An example of a schematic diagram of an attack graph for the entire system to be diagnosed, generated without narrowing down the facts to be referenced, can be represented as shown in FIG. 9 above. In contrast, a schematic diagram of an attack graph generated by the analysis unit 6 for each pair of the fact that is the start point and the fact that is the end point can be represented as the attack graphs 51 to 56 illustrated in FIG. 10. For example, the fact that is the end point of the attack graph 51 coincides with the fact that is the start point of the attack graphs 54 and 55. Therefore, the analysis unit 6 connects the attack graphs 51 and 54 by making the node corresponding to the fact that is the end point of the attack graph 51 and the node corresponding to the fact that is the start point of the attack graph 54 the same node. Similarly, the analysis unit 6 connects the attack graphs 51 and 55. In the same way, the analysis unit 6 connects the attack graphs that can be connected. The facts that are the start points of attack graphs 51, 52, and 53, respectively, are identical. Therefore, the analysis unit 6 connects the attack graphs 51, 52, and 53 by making the node corresponding to the fact that is the start point of each of the attack graphs 51, 52, and 53 the same node.

In addition to the operation of the first example embodiment, the display control unit 8 may display the attack graph after connection on the display device 9.

By repeating the process of connecting the attack graphs that can be connected as described above, attack graphs for the entire system to be diagnosed can be generated. As explained in the first example embodiment, the calculation amount required to generate an attack graph for each pair of the fact that is the start point and the fact that is the end point is small. Therefore, according to the second example embodiment, the attack graph for the entire system to be diagnosed can be generated with less calculation amount than when directly generating the attack graph for the entire system to be diagnosed.

Also, according to the second example embodiment, the attack graph for the entire system to be diagnosed can be generated, so the administrator can grasp the status of attacks on the entire system to be diagnosed. As a result, the administrator can easily determine the vulnerabilities of the entire system to be diagnosed and plan countermeasures against attacks on those vulnerabilities.

Figure 11:
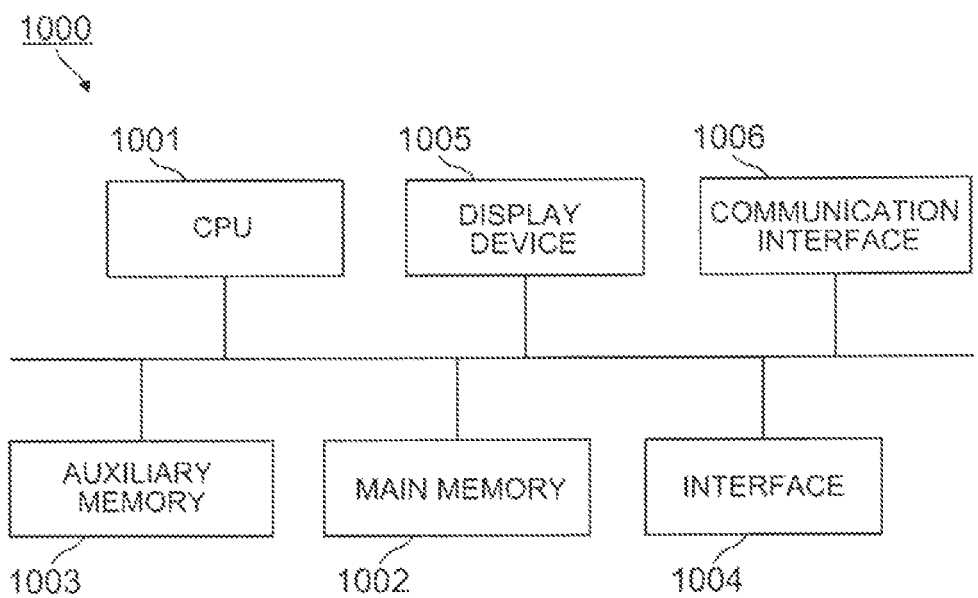
FIG. 11 It depicts a schematic block diagram of a configuration example of a computer for an analysis system of example embodiment of the present invention.

FIG. 11 is a schematic block diagram of a configuration example of a computer for an analysis system of each example embodiment of the present invention. The computer comprises a CPU 1001, a main memory 1002, an auxiliary memory 1003, an interface 1004, a display device 1005 and a communication interface 1006.

The analysis system 1 of each example embodiment of the present invention is realized by a computer 1000. The operation of the analysis system 1 is stored in the auxiliary memory 1003 in the form of an analysis program. The CPU 1001 reads the analysis program from the auxiliary memory 1003, deploys the program to the main memory 1002, and executes the processes described in the above example embodiments according to the analysis program.

The auxiliary memory 1003 is an example of a non-transitory tangible medium. Other examples of non-transitory tangible media are a magnetic disk, an optical magnetic disk, a CD-ROM (Compact Disk Read Only Memory), a DVD-ROM (Digital Versatile Disk Read Only Memory), a semiconductor memory, and the like, which are connected through the interface 1004. When the program is delivered to the computer 1000 through a communication line, the computer 1000 that receives the delivery may develop the program into the main memory 1002 and operate according to the program.

Some or all of the components may be realized by general-purpose or dedicated circuitry, processors, or a combination of these. They may be configured by a single chip or by multiple chips connected through a bus. Some or all of the components may be realized by a combination of the above-mentioned circuitry, etc. and a program.

When some or all of each component is realized by multiple information processing devices, circuits, etc., the multiple information processing devices, circuits, etc. may be centrally located or distributed. For example, the information processing devices, circuits, etc. may be implemented as a client-and-server system, cloud computing system, etc., each of which is connected through a communication network.

Figure 12:
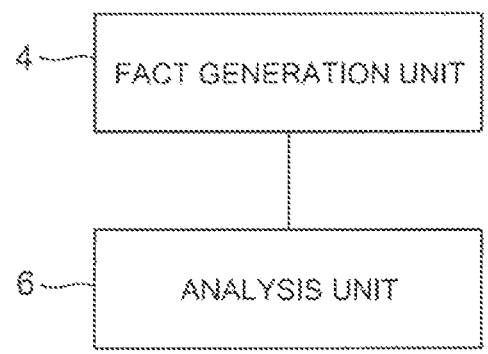
FIG. 12 It depicts a block diagram showing a summarized analysis system of the present invention.

Next, a summary of the present invention will be described. FIG. 12 is a block diagram showing a summarized analysis system of the present invention. The analysis system of the present invention comprises a fact generation unit 4 and an analysis unit 6.

The fact generation unit 4 generates a fact which is data representing security situation of a system to be diagnosed, based on information regarding each device included in the system to be diagnosed.

The analysis unit 6 generates one or more pairs of a start point fact which is a fact representing possibility of attack in a device that is a start point and an end point fact which is a fact representing possibility of attack in a device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generates an attack graph from a node corresponding to the start point fact to a node corresponding to the end point fact, in a case where it is possible to derive the end point fact from the start point fact.

With such a configuration, it is possible to reduce the calculation amount of risk analysis.

The example embodiments of the present invention described above may also be described as supplementary notes below, but is not limited to the following.

(Supplementary Note 1)

An analysis system comprising:
  a fact generation unit which generates a fact which is data representing security situation of a system to be diagnosed, based on information regarding each device included in the system to be diagnosed; and
  an analysis unit which generates one or more pairs of a start point fact which is a fact representing possibility of attack in a device that is a start point and an end point fact which is a fact representing possibility of attack in a device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generates an attack graph from a node corresponding to the start point fact to a node corresponding to the end point fact, in a case where it is possible to derive the end point fact from the start point fact.

(Supplementary Note 2)

The analysis system according to supplementary note 1, wherein
  the analysis unit
  connects attack graphs to each other when the generated attack graphs can be connected to each other.

(Supplementary Note 3)

The analysis system according to supplementary note 2, wherein when the end point fact of one attack graph matches the start point fact of another attack graph, the analysis unit determines that the attack graphs can be connected.

(Supplementary Note 4)

The analysis system according to supplementary note 2 or 3, wherein when the end point fact of one attack graph matches the start point fact of another attack graph, the analysis unit connects the attack graphs by making the node corresponding to the end point fact and the node corresponding to the start point fact the same node.

(Supplementary Note 5)

The analysis system according to any one of supplementary notes 1 to 4, wherein the analysis unit generates a combination of one of the devices, one of multiple types of attack states defined in advance, and one of privileges that can correspond to the attack state, as the start point fact, and generates a combination of one of the devices, one of the multiple types of the attack states, and one of privileges that can correspond to the attack state, as the end point fact.

(Supplementary Note 6)

The analysis system according to any one of supplementary notes 1 to 5, wherein the analysis rule includes an element corresponding a condition, and an element representing a new fact, wherein the analysis unit repeats operation of deriving a new fact based on the analysis rule if there is an existing fact which matches the element corresponding the condition, and adding the new fact to existing facts, and determines that it is possible to derive the end point fact from the start point fact if the new fact corresponds to the end point fact.

(Supplementary Note 7)

The analysis system according to any one of supplementary notes 1 to 6, wherein the analysis unit generates the start point fact and the end point fact based on some of the devices included in the system to be diagnosed.

(Supplementary Note 8)

The analysis system according to supplementary note 7, wherein some of the devices included in the system to be diagnosed are devices included in same subnet of the system to be diagnosed.

(Supplementary Note 9)

The analysis system according to supplementary note 7, wherein some of the devices included in the system to be diagnosed are devices that can communicate directly.

(Supplementary Note 10)

The analysis system according to any one of supplementary notes 1 to 9, further comprising:

a display control unit which displays the attack graph generated by the analysis unit on a display device.

(Supplementary Note 11)

An analysis method, wherein one or more computers generate a fact which is data representing security situation of a system to be diagnosed, based on information regarding each device included in the system to be diagnosed; and generate one or more pairs of a start point fact which is a fact representing possibility of attack in a device that is a start point and an end point fact which is a fact representing possibility of attack in a device that is an end point, analyze, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generate an attack graph from a node corresponding to the start point fact to a node corresponding to the end point fact, in a case where it is possible to derive the end point fact from the start point fact.

(Supplementary Note 12)

An analysis program causing a computer to execute:

a fact generation process of generating a fact which is data representing security situation of a system to be diagnosed, based on information regarding each device included in the system to be diagnosed; and an analysis process of generating one or more pairs of a start point fact which is a fact representing possibility of attack in a device that is a start point and an end point fact which is a fact representing possibility of attack in a device that is an end point, analyzing, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generating an attack graph from a node corresponding to the start point fact to a node corresponding to the end point fact, in a case where it is possible to derive the end point fact from the start point fact.

Although the invention of the present application has been described above with reference to the example embodiments, the present invention is not limited to the above example embodiments. Various changes can be made to the configuration and details of the present invention that can be understood by those skilled in the art within the scope of the present invention.

INDUSTRIAL APPLICABILITY

The present invention is suitably applied to an analysis system that analyzes attacks on systems to be diagnosed.

REFERENCE SIGNS LIST

1 Analysis system
2 Data collection unit
3 Data storage unit
4 Fact generation unit 5 Analysis rule storage unit
6 Analysis unit
7 Attack graph storage unit
8 Display control unit
9 Display device

The invention claimed is:

1. An analysis system comprising:

a fact generation unit which generates a fact which is data representing security situation of a system to be diagnosed, based on information regarding each device included in the system to be diagnosed; and an analysis unit which generates one or more pairs of a start point fact which is a fact representing possibility of attack in a device that is a start point and an end point fact which is a fact representing possibility of attack in a device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generates an attack graph from a node corresponding to the start point fact to a node corresponding to the end point fact, in a case where it is possible to derive the end point fact from the start point fact.

2. The analysis system according to claim 1, wherein the analysis unit connects attack graphs to each other when the generated attack graphs can be connected to each other.

3. The analysis system according to claim 2, wherein when the end point fact of one attack graph matches the start point fact of another attack graph, the analysis unit determines that the attack graphs can be connected.

4. The analysis system according to claim 2, wherein when the end point fact of one attack graph matches the start point fact of another attack graph, the analysis unit connects the attack graphs by making the node corresponding to the end point fact and the node corresponding to the start point fact the same node.

5. The analysis system according to claim 1, wherein the analysis unit generates a combination of one of the devices, one of multiple types of attack states defined in advance, and one of privileges that can correspond to the attack state, as the start point fact, and generates a combination of one of the devices, one of the multiple types of the attack states, and one of privileges that can correspond to the attack state, as the end point fact.

6. The analysis system according to claim 1, wherein the analysis rule includes an element corresponding a condition, and an element representing a new fact, wherein the analysis unit repeats operation of deriving a new fact based on the analysis rule if there is an existing fact which matches the element corresponding the condition, and adding the new fact to existing facts, and determines that it is possible to derive the end point fact from the start point fact if the new fact corresponds to the end point fact.

7. The analysis system according to claim 1, wherein the analysis unit generates the start point fact and the end point fact based on some of the devices included in the system to be diagnosed.

8. The analysis system according to claim 7, wherein some of the devices included in the system to be diagnosed are devices included in same subnet of the system to be diagnosed.

9. The analysis system according to claim 7, wherein some of the devices included in the system to be diagnosed are devices that can communicate directly.

10. The analysis system according to claim 1, further comprising:

a display control unit which displays the attack graph generated by the analysis unit on a display device.

11. An analysis method, wherein one or more computers generate a fact which is data representing security situation of a system to be diagnosed, based on information regarding each device included in the system to be diagnosed; and generate one or more pairs of a start point fact which is a fact representing possibility of attack in a device that is a start point and an end point fact which is a fact representing possibility of attack in a device that is an end point, analyze, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generate an attack graph from a node corresponding to the start point fact to a node corresponding to the end point fact, in a case where it is possible to derive the end point fact from the start point fact.

12. A non-transitory computer-readable recording medium in which an analysis program is recorded, the analysis program causing a computer to execute:

a fact generation process of generating a fact which is data representing security situation of a system to be diagnosed, based on information regarding each device included in the system to be diagnosed; and an analysis process of generating one or more pairs of a start point fact which is a fact representing possibility of attack in a device that is a start point and an end point fact which is a fact representing possibility of attack in a device that is an end point, analyzing, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, without using facts representing states of devices generated based on information regarding a device that is not either the device that is the start point or the device that is the end point, and generating an attack graph from a node corresponding to the start point fact to a node corresponding to the end point fact, in a case where it is possible to derive the end point fact from the start point fact.

* * * * *